United States Patent [19]

Turunc et al.

[11] Patent Number: 5,866,523

[45] Date of Patent: Feb. 2, 1999

[54] RESINOUS COMPOSITION CLEANER

[75] Inventors: Umit Turunc, Doylestown; Patricia A. Popowich, Morrisville, both of Pa.

[73] Assignee: BetzDearborn Inc., Trevose, Pa.

[21] Appl. No.: 970,695

[22] Filed: Nov. 14, 1997

[51] Int. Cl.⁶ ........................................................ C11D 3/44
[52] U.S. Cl. ........................ 510/206; 510/188; 510/203; 510/234; 510/421; 510/505; 510/506
[58] Field of Search ..................... 510/234, 188, 510/203, 206, 421, 505, 506; 252/228

[56] References Cited

U.S. PATENT DOCUMENTS

| | | | |
|---|---|---|---|
| 3,131,154 | 4/1964 | Klausner | 252/305 |
| 3,796,602 | 3/1974 | Briney et al. | 134/38 |
| 4,309,300 | 1/1982 | Danforth et al. | 252/170 |
| 5,188,675 | 2/1993 | Dormon-Brailsford | 134/4 |
| 5,536,439 | 7/1996 | Harbin | 510/212 |
| 5,643,860 | 7/1997 | Mella | 510/245 |

FOREIGN PATENT DOCUMENTS

WO 96/15200  5/1996  WIPO ............................... C09D 9/00

OTHER PUBLICATIONS

Taisuke et al., Cleaning Agent Composition, JP Patent 06,322,393, Abstract, Nov. 94.

*Primary Examiner*—Ardith Hertzog
*Assistant Examiner*—Christine Ingersoll
*Attorney, Agent, or Firm*—Alexander D. Ricci; Matthew W. Smith

[57] ABSTRACT

A cleaning composition and method of use are disclosed. The composition comprises a mixture of a ketone, at least one glycol ether, water and optionally a surfactant. The composition when applied to substrates coated with resinous coatings is effective for removing the coating from the substrate.

2 Claims, No Drawings

RESINOUS COMPOSITION CLEANER

FIELD OF THE INVENTION

The present invention relates to pH neutral, single phase aqueous cleaning compounds. More particularly, the present invention relates to aqueous cleaning compounds for removing paints and resinous coatings from surfaces of equipment which must be cleaned-in-place.

BACKGROUND OF THE INVENTION

Latex paints and resinous dispersion coatings ("resinous materials") generally are comprised of polymeric resins such as acrylics, styrene-butadienes, polyvinyl acetates and acrylates; plasticizers; surfactants; inorganic fillers such as aluminum compounds, silica and transition metals; and colorants such as titanium dioxide, cobalt compounds, and chromium compounds.

Manufactures and industrial consumers of resinous materials typically utilize storage tanks and application equipment with large liquid storage capacity to store and handle resinous materials. When such tanks and equipment are shut down for maintenance or when the resinous material formulation is changed, it is frequently necessary to clean the dried and agglomerated resinous material from tank and equipment surfaces. Industrial equipment for handling resinous material, including all the associated piping, is often capable of holding hundreds of gallons of resinous materials and is not easily disassembled for cleaning. Such equipment must be "cleaned-in-place" because disassembly for cleaning is difficult or impossible. Equipment which must be cleaned-in-place is typically designed with cleaning systems which include agitation means to contact the equipment internal surfaces with cleaners to remove resinous material without requiring substantial equipment disassembly. As used herein, the term "agitation" is defined as any action to circulate and/or recycle the invention cleaning composition in contact with the substrate to be cleaned. The term "agitation" includes, but is not limited to, pumping, spraying, foaming, shaking and vibrating. The systems which are designed to clean equipment without substantial disassembly are called clean-in-place (CIP) systems. In order for CIP systems to be effective, resinous material cleaners must not only soften dried and /or agglomerated resinous material deposits, the cleaner must also cause the deposits to be easily removed from the substrate with minimal agitation.

It is well known in industry that volatile solvents such as acetone and methanol, and chlorinated solvents such as methylene chloride and carbon tetrachloride, are effective as resinous material cleaners for CIP operations. However, volatile organic solvents and chlorinated organic solvents are increasingly unacceptable for many operations due to flammability and environmental concerns.

Thus a need exists for a resinous material cleaner which is effective for use in CIP operations and which does not have the problems associated with volatile organic and chlorinated hydrocarbon solvents.

Accordingly, it is an object of this invention to provide an aqueous cleaning composition effective for removing resinous materials from equipment surfaces which must be cleaned-in-place.

SUMMARY OF THE INVENTION

The present invention is a composition and a method of using the composition to clean dried and/or agglomerated resinous coatings from equipment such as chemical process, chemical transport and chemical storage equipment which must be cleaned-in-place.

The single phase aqueous cleaning composition is comprised of:

(a) about 2 to 40 weight percent ketone;

(b) about 2 to 65 weight percent of at least one glycol ether;

(c) about 0 to 4 weight percent non-ionic surfactant; and (d) the remainder to equal 100 weight percent water.

The aqueous cleaning composition is effective for use in a method for removing a resinous material, from a substrate coated with a resinous material, within equipment which must be cleaned-in-place. The method comprises (a) contacting a substrate, coated with a resinous material, with the invention aqueous cleaning composition; and (b) removing the softened coating and the invention cleaner from the substrate.

DETAILED DESCRIPTION OF THE PREFERRED EMBODIMENTS

The present invention provides an aqueous cleaning composition for removing resinous material coatings from a substrate. The inventors have discovered an aqueous cleaning composition which is effective for removing resinous materials from surfaces coated with dried and/or agglomerated resinous materials. The invention cleaning composition has a neutral pH, and will remain in a single phase at temperatures up to about 60° C. The invention cleaning composition has particular utility for removing resinous materials from surfaces within equipment which must be cleaned-in-place. The aqueous cleaning composition is comprised of:

(a) about 2 to 40 weight percent ketone;

(b) about 2 to 65 weight percent of at least one glycol ether;

(c) about 0 to 4 weight percent non-ionic surfactant; and (d) the remainder to equal 100 weight percent water.

The preferred ketones for use in the invention cleaning composition are methyl isobutyl ketone (MIBK) and methyl isoamyl ketone (MIAK). Cyclohexanone is also effective but is less preferred than MIBK and MIAK due to the amount of additional agitation required to remove resinous material from substrates contacted with cyclohexanone containing cleaners, as compared to cleaners containing MIBK and MIAK.

The preferred glycol ethers are ethylene glycol monomethyl ether, ethylene glycol monoethyl ether, ethylene glycol monopropyl ether, ethylene glycol monobuytl ether, diethylene glycol monomethyl ether, diethylene glycol monoethyl ether (DE), diethylene glycol monopropyl ether (DP), diethylene glycol mono-n-butyl ether (DB), methoxytriglycol, ethoxytriglycol, butyltriglycol, propylene glycol monomethyl ether, propylene glycol monobutyl ether, dipropylene glycol monomethyl ether (DPM), and tripropylene glycol monomethyl ether (TPM).

The invention composition is effective without a surfactant component. However, invention compositions containing a surfactant require less agitation to remove resinous materials from a substrate than do invention compositions which do not contain a surfactant. The preferred surfactants are polyoxyethylene-polyoxypropylene (EO/PO) block copolymer surfactants having a number average molecular weight between 1000 and 3000 such as available commercially from BASF as Pluronic R block copolymers 25R1/

25R4, 25R2, 17R2 and 22R4 and EO/PO block copolymer surfactants having a number average molecular weight of between 950 and 4000 such as Pluronic block copolymers L61/L62, L81/P84, L63/L64 and L63/L65 also available commercially from BASF.

The ketone components of this invention have limited solubility in water. Therefore, in the preferred embodiment of this invention, two glycol ethers are present, at least one of which is a cosolvent to increase the solubility of the preferred ketone components in water.

The preferred embodiment of this invention composition is comprised of:

(a) about 5 to 15 weight percent methyl isoamyl ketone;

(b) about 5 to 15 weight percent dipropylene glycol monomethyl ether;

(c) about 25 to 35 weight percent diethylene glycol monopropyl ether as a cosolvent for methyl isoamyl ketone;

(d) about 0.5 to 2 weight percent EO/PO block copolymer surfactant having a molecular weight of about 1000 to 3000; and (e) about 50 weight percent water with the proviso that the sum of the weight percentages of (a)–(e) equals 100 weight percent.

The cleaning composition is preferably added directly to the clean-in-place system where it is applied to surfaces coated with a resinous material. The invention cleaning composition can also be added to a CIP system as a "concentrate" and diluted to the desired strength with water.

The preferred concentrate is comprised of about 20 weight percent methyl isoamyl ketone (MIAK) about 58 weight percent diethylene glycol monopropyl ether (DP) about 20 weight percent dipropylene glycol methyl ether (DPM) and about 2 weight percent EO/PO block copolymer surfactant. When combined with about 50 weight percent water, the concentrate forms the aqueous cleaning composition of this invention having the most preferred formulation comprising about 10 weight percent MIAK, about 29 weight percent DP, about 10 weight percent DPM, about 1 weight percent surfactant and about 50 weight percent water. The invention composition can also be shipped and stored as a "concentrate" until it is needed.

The method of using the invention to remove a resinous coating from a coated substrate comprises the steps of:

(a) contacting a substrate, coated with a resinous material, with the invention aqueous cleaning composition; and (b) removing the softened coating and the invention cleaner from the substrate.

The removal step (b) can be the result of agitation, such as by a continuous spray of the invention composition into physical contact with the substrate, and/or by stirring, vibrating, pump circulation and /or recycling of the invention cleaning composition into physical contact with the substrate. Step (b) can also be the result of agitation caused by rinsing the softened coating from the substrate with a rinsing agent such as water. The invention composition has particular utility for cleaning resinous materials from surfaces coated with dried and/or agglomerated resinous material within resinous material handling equipment. Such equipment includes, but is not limited to, latex paint manufacturing reaction vessels, industrial paint spray equipment, storage vessels, vats, drums, tanks, piping and related equipment; particularly large vessels and piping which must be cleaned in place.

The invention will now be further described with reference to a number of specific examples which are to be regarded solely as illustrative and not restricting the scope of the present invention.

Example I

Plugs of two air dried coating materials, described in Table I below, were placed in sealed beakers with different cleaning compounds and agitated by stirring for 30 minutes at various temperatures. The ability of the cleaning compound to dissolve the plugs were evaluated on a scale of 0 to 10, with 0 being "not effective" and 10 being "effective". The results are shown in Table II. In Table II "T°C." indicates temperature in degrees Celsius and "RT" indicates a room temperature of approximately 20°–22° Celsius.

TABLE I

| Weight % | Coating A Components |
|---|---|
| 10–30 | Methyl methacrylate/methacrylic acid polymer |
| 70–90 | solvent carriers plasticizer and inorganic pigments |
| | Coating B Components |
| 5–10 | Acrylic resin |
| 90–95 | solvent carriers, plasticizer and inorganic pigments |

TABLE II

| T °C. | Cleaner | Plug A | Plug B |
|---|---|---|---|
| RT | Water | 0 | 0 |
| 70 | Water | 0 | 4–5 |
| RT | 10% BK 4000/90% Water | 0 | 0 |
| 70 | 10% BK 4000/90% Water | 0 | 7–8 |
| RT | 10% L 815/90% Water | 0 | 0 |
| 70 | 10% L 815/90% Water | 0 | 7 |
| RT | Plasite No. 71 Thinner | 9 | 9 |
| RT | MIBK | 10 | 5 |
| 70 | MIBK | 9–10 | 4–5 |
| RT | Methylene chloride | 10 | 3 |
| RT | Acetone | 9 | 9 |
| RT | 30% DP/70% H$_2$O | 0 | 9 |
| RT | DB | 0 | 3 |
| RT | DPM | 1–2 | |
| 70 | DPM | 5 | 9–10 |
| 70 | TPM | 2–3 | 2–3 |
| 70 | 30% DPM/1% CM460 surfactant mixture/69% water | 2–3 | 9 |
| RT | 75% DPM/25% MIBK | * | * |
| RT | 10% MIAK/20.3% DE/ 8.7% Ethyleneglycol 10% PPM/1% Pluronic 25R2/ 50% Water | * | * |
| 60 | 10% MIAK/29% DB 10% DPM/1% Pluronic 25R2/50% water | 7–8* | 10 |
| RT | 15% MIBK/35% DP/ 50% water | 10 | 4–5 |
| RT | 10% MIBK/35% DP/ 5% DPM/50% water | 9 | 4–5 |
| 70 | 10% MIBK/30% DP 10% DPM/50% water | 10 | 10 |
| 70 | 10% MIBK/30% DP/ 10% TPM/50% water | 7–8 | 10 |
| RT | Cyclohexanone | 6 | 6 |
| 60 | Cyclohexanone | 10 | 10 |
| 60 | 20% cyclohexanone/ 20.5% DP/9.5% DPM/ 50% water | 10 | 7–8** |
| 60 | 17% CH/17.5% DP/15.5% DPM/ 50% water | 5–6 | 10 |
| 60 | 17% CH/17.5% DP/ 15.5% TPM/50% water | 5–6 | 10 |
| 60 | 10% MIAK/30%DP/ 10% DPM/50% water | 8–9 | 10 |
| 60 | 10% MIAK/29% DP/ | 9 | 10 |

TABLE II-continued

| T °C. | Cleaner | Plug A | Plug B |
| --- | --- | --- | --- |
| | 10% DPM/1% Pluronic 25R2/50% water | | |
| 70 | 10% MIAK/29% DP/ 10% DPM/1% Pluronic 25R2/50% water | 9–10 | 10 |
| 60 | 10% MIAK/30% DP/ 10% TPM/50% water | 10 | 10 |
| 70 | 10% MIAK/30% DP/ 10% DPM/0.25% Pluronic L61/0.5% Pluronic P65/ 49.25% water | 9 | 10 |
| 70 | 10% MIAK/30% DP/ | 10 | 10 |

Example II

The inside surfaces of 250 ml stainless steel beakers were coated with coatings A and B (described in Table I) and air dried for five minutes. Ten grams of cleaning compound were placed in each beaker, the beakers were sealed with aluminum foil and placed in a temperature controlled bath shaker bath at 70° C. and 110 revolutions per minute (rpm) for 30 minutes. The coating residues adhering to the beaker surfaces were rinsed off with deionized water.

The ease of rinsing the coating residues from the beaker surfaces was evaluated on a scale of 0 to 10 with 0 rated a "not effective" and 10 rated as "effective".

The results are shown in Table III.

TABLE III

| Test | Formulation | A Pre-rinse | B Pre-rinse | Comment | A Post-rinse | B Post-rinse | Comment |
| --- | --- | --- | --- | --- | --- | --- | --- |
| 1 | 10% methyl isobutyl ketone (MIBK) 29% diethylene glycol monopropyl ether (DP) 10% dipropylene glycol methyl ether (DPM) 50% deionized water 1% Pluronic 25R2 | 9 | 9 | A agglomerates with light residual/B agglomerates with heavy residual. | 10 | 10 | A rinsed easily/B gelled quickly. Moderately difficult to rinse. |
| 2 | 10% methyl isoamyl ketone (MIAK) 29% diethylene glycol monopropyl ether (DP) 10% dipropylene glycol methyl ether (DPM) 50% deionized water 1% Pluronic 25R2 | 9 | 9 | A agglomerates with light residual/B agglomerates with heavy residual. | 10 | 10 | A rinsed easily/B gelled quickly. Moderately difficult to rinse. |
| 3 | 16.5% cyclohexanone 17% diethylene glycol monopropyl ether (DP) 15.5% dipropylene glycol methyl ether (DPM) 50% deionized water 1% Pluronic 25R2 | 9 | 9 | A agglomerates with light residual/B agglomerates with heavy residual. | 10 | 10 | A rinsed away easily/B gelled. Very difficult to rinse away. |
| 4 | 100% deionized water | 1–2 | 2 | Large amount of B remain. | 1–2 | 2 | A difficult to rinse away. Large amount of B remains. |

Rating:
0 = Not Effective
10 = Effective

TABLE II-continued

| T °C. | Cleaner | Plug A | Plug B |
| --- | --- | --- | --- |
| | 10% DPM/0.5% Pluronic R25R1/0.5% Pluronic 25R4/ 49% water | | | where the percentages of the indicated components are given as weight percentages, * indicates the cleaning composition separated into multiple phases and ** indicates the cleaning composition softened the resinous material into a sticky, agglomerate which could not be removed by agitation. "BK 4000" is an alkaline cleaner available commercially from BetzDearborn. "L 815" is an acidic cleaner available commercially from BetzDearborn. "Plasite No. 71 Thinner" is a ketone based product available commercially from Wisconsin Protective Coating Co. "CM460" is a nonionic surfactant mixture available commercially from BetzDearborn.

Thus, the present invention provides a single phase aqueous cleaning composition and a method of using the composition which is effective for removing resinous coatings such as latex paints and similar coatings from coated substrate surfaces. The invention has particular utility for removing dried and agglomerated resinous materials from equipment surfaces which must be cleaned-in-place.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

We claim:

1. A single phase aqueous cleaning composition comprising:
   (a) about 5 to 15 weight percent methyl isoamyl ketone;
   (b) about 25 to 35 weight percent diethylene glycol monopropyl ether;

(c) about 5 to 15 weight percent dipropylene glycol monomethyl ether;

(d) about 0.5 to 2 weight percent EO/PO block copolymer surfactant having a molecular weight of about 1000 to 3000; and (e) about 50 weight percent water, with the proviso that the sum of the weight percentages of (a) to (e) equals 100 weight percent.

2. A method of removing dried and/or agglomerated resinous materials from the surfaces of substrates which must be cleaned in place, said method comprising:

(a) contacting the surfaces of a substrate, coated with dried and/or agglomerated resinous material, with a single phase aqueous, pH neutral cleaning composition comprising:

(i) about 5 to 15 weight percent methyl isoamyl ketone;

(ii) about 25 to 35 weight percent diethylene glycol monopropyl ether and 5 to 15 weight percent dipropylene glycol monomethyl ether;

(iii) about 0.5 to 2 weight percent EO/PO block copolymer surfactant having a molecular weight of about 1000 to 3000; and (iv) about 50 weight percent water, with the proviso that the sum of the weight percentages of (i) to (iv) equals 100 weight percent;

(b) removing said resinous material and the said cleaning composition from said substrate.

* * * * *

UNITED STATES PATENT AND TRADEMARK OFFICE
CERTIFICATE OF CORRECTION

PATENT NO. : 5,866,523
DATED : February 2, 1999
INVENTOR(S) : Umit Turune, Patricia A. Popowich It is certified that error appears in the above-identified patent and that said Letters Patent is hereby corrected as shown below:

In Column 4, line 40, the result for DPM Plug B should read

--- 5-6 ---.

Signed and Sealed this

Seventh Day of September, 1999

*Attest:*

Q. TODD DICKINSON

*Attesting Officer*     *Acting Commissioner of Patents and Trademarks*